(12) United States Patent
Wang et al.

(10) Patent No.: US 10,070,332 B2
(45) Date of Patent: Sep. 4, 2018

(54) METHOD AND APPARATUS FOR MEASUREMENT REPORTING AND EVENT-TRIGGERED PERIODIC MEASUREMENT REPORTING IN AN EVOLVED UNIVERSAL TERRESTRIAL RADIO ACCESS NETWORK

(75) Inventors: Jin Wang, Central Islip, NY (US); Peter S. Wang, E. Setauket, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 2025 days.

(21) Appl. No.: 12/143,563

(22) Filed: Jun. 20, 2008

(65) Prior Publication Data
US 2009/0005029 A1    Jan. 1, 2009

Related U.S. Application Data

(60) Provisional application No. 60/945,425, filed on Jun. 21, 2007, provisional application No. 60/949,635, filed on Jul. 13, 2007.

(51) Int. Cl.
*H04W 24/10* (2009.01)
*H04W 36/20* (2009.01)
(Continued)

(52) U.S. Cl.
CPC ....... *H04W 24/10* (2013.01); *H04W 72/1226* (2013.01); *H04W 28/16* (2013.01);
(Continued)

(58) Field of Classification Search
CPC ............. H04W 24/10; H04W 72/1284; H04W 36/0088; H04W 36/20; H04W 28/16; H04W 72/1226
See application file for complete search history.

(56) References Cited

U.S. PATENT DOCUMENTS 5,420,864 A * 5/1995 Dahlin ................ H04B 7/2615
                                                      370/337
6,445,917 B1   9/2002 Bark et al.
(Continued)

FOREIGN PATENT DOCUMENTS

CN    1371579    9/2002
CN    1399855    2/2003
(Continued)

OTHER PUBLICATIONS

Anas et al., "Performance Evaluation of Received Signal Strength Based Hard Handover for UTRAN LTE," IEEE Vehicular Technology Conference, pp. 1046-1050 (Apr. 2007).
(Continued)

*Primary Examiner* — Walter Divito
*Assistant Examiner* — Anthony Luo
(74) *Attorney, Agent, or Firm* — Quasim A. Shah

(57) ABSTRACT

A method and apparatus for measurement reporting and event-triggered periodic measurement reporting in an evolved universal terrestrial radio access network (E-UTRAN) are disclosed. A wireless transmit/receive unit (WTRU) monitors cell-specific reference signals from a serving cell and neighbor cells to detect a reporting event defined for the E-UTRAN. Once a reporting event is detected, the WTRU sends a measurement report to the network. The measurement quantity may be a reference signal received quality (RSRQ). After detection of the reporting event, the WTRU may send event-triggered measurement reports periodically. The WTRU may send a scheduling request to the network for the event-triggered periodic measurement reports. The WTRU may send a termination indication if the event-triggered periodic measurement reports are terminated before a configured number of times. The WTRU may send an extension request if a
(Continued)

specified number of periodic reporting has been sent but more reports still need to be sent.

22 Claims, 3 Drawing Sheets

(51) Int. Cl.
H04W 72/12 (2009.01)
H04W 28/16 (2009.01)
H04W 36/00 (2009.01)
(52) U.S. Cl.
CPC ........ H04W 36/0088 (2013.01); H04W 36/20 (2013.01); H04W 72/1284 (2013.01)

(56) References Cited

U.S. PATENT DOCUMENTS

| | | | |
|---|---|---|---|
| 6,845,238 | B1 | 1/2005 | Mueller |
| 6,873,662 | B2 | 3/2005 | Oh et al. |
| 7,003,290 | B1 | 2/2006 | Salonaho et al. |
| 7,684,799 | B2* | 3/2010 | Kuchibhotla et al. ........ 455/436 |
| 7,783,299 | B2 | 8/2010 | Anderson et al. |
| 2003/0067920 | A1* | 4/2003 | Rezaiifar ............. H04L 1/1809 370/394 |
| 2004/0179492 | A1* | 9/2004 | Zhang .................. H04W 24/10 370/331 |
| 2005/0197124 | A1* | 9/2005 | Kang et al. .................... 455/439 |
| 2006/0211415 | A1* | 9/2006 | Cassett ................ H04W 24/04 455/423 |
| 2006/0281462 | A1 | 12/2006 | Kim et al. |
| 2007/0021086 | A1* | 1/2007 | Chiu .................... H04B 1/7117 455/277.1 |
| 2007/0161379 | A1* | 7/2007 | Morisaki .............. G01S 5/0221 455/456.1 |
| 2007/0232238 | A1* | 10/2007 | Kawasaki ........................ 455/69 |
| 2007/0249355 | A1* | 10/2007 | Kang et al. .................... 455/439 |
| 2008/0107163 | A1* | 5/2008 | Goransson ................... 375/225 |
| 2008/0186919 | A1* | 8/2008 | Huang et al. ................. 370/331 |
| 2008/0268785 | A1* | 10/2008 | McCoy et al. ............. 455/67.11 |
| 2008/0268843 | A1* | 10/2008 | Ore et al. .................... 455/435.3 |
| 2009/0088160 | A1* | 4/2009 | Pani et al. .................... 455/436 |
| 2009/0137246 | A1* | 5/2009 | Xing et al. .................... 455/434 |

FOREIGN PATENT DOCUMENTS

| | | |
|---|---|---|
| CN | 1711795 | 12/2005 |
| CN | 1897757 | 1/2007 |
| CN | 1972490 | 5/2007 |
| EP | 1 473 956 | 11/2004 |
| EP | 1646261 A2 | 4/2006 |
| EP | 1677564 | 7/2006 |
| EP | 1720289 A1 | 11/2006 |
| EP | 1734779 | 12/2006 |
| JP | 2003-500909 | 1/2003 |
| JP | 2003-509982 | 3/2003 |
| JP | 2002-504792 | 2/2006 |
| JP | 2006-352883 | 12/2006 |
| TW | I323099 | 4/2010 |
| WO | 00/70897 | 11/2000 |
| WO | WO-01/20942 | 3/2001 |
| WO | WO-2004/043101 | 5/2004 |
| WO | WO-2006/135542 | 12/2006 |
| WO | WO-2007/052922 | 5/2007 |

OTHER PUBLICATIONS

Ericsson, "Idle Gaps for Handover Measurements in E-UTRAN", 3GPP TSG-RAN WG2 Meeting #55, R2-062865, (Seoul, Korea, Oct. 9-13, 2006).
Ericsson, "LTE Measurement Control: Measurement Reporting Events", 3GPP TSG-RAN WG2 Meeting #59bis, R2-074090, (Shanghai, China, Oct. 8-12, 2007).
Ericsson, "E-UTRA Measurement Configuration and Control", 3GPP TSG-RAN WG2 Meeting #58, R2-071823, (Kobe, Japan, May 7-11, 2007).
Nortel, "Intra-Frequency Reporting Events", 3GPP TSG RAN WG2#59, R2-073034, (Athens, Greece, Aug. 20-24, 2007).
Third Generation Partnership Project, "Technical Specification Group Radio Access Network; Evolved Universal Terrestrial Radio Access (E-UTRA) and Evolved Universal Terrestrial Radio Access Network (E-UTRAN); Radio interface protocol aspects (Release 7)", 3GPP TR 25.813, V7.1.0, (Sep. 2006).
Third Generation Partnership Project, "Technical Specification Group Services and System Aspects; Requirements for Evolved UTRA (E-UTRA) and Evolved UTRAN (E-UTRAN) (Release 7)", 3GPP TR 25.913, V7.3.0, (Mar. 2006).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.0.0, (Apr. 2007).
Third Generation Partnership Project, "Technical Specification Group Radio Access Network; Evolved Universal Terrestrial Radio Access (E-UTRA) and Evolved Universal Terrestrial Radio Access network (E-UTRAN); Overall Description; Stage 2 (Release 8)", 3GPP TS 36.300, V8.4.0, (Mar. 2008).
Third Generation Partnership Project, "Technical Specification Group Radio Access Network; Physical Layer Procedures (FDD) (Release 7)." 3GPP TS 25.214, V7.5.0, (Jun. 2007).
Third Generation Partnership Project, "Technical Specification Group Radio Access Network; Physical Layer Procedures (FDD) (Release 7)." 3GPP TS 25.214, V7.9.0, (Jun. 2008).
Third Generation Partnership Project, "Technical Specification Group Radio Access Network; Physical Layer Procedures (FDD) (Release 8)." 3GPP TS 25.214, V8.2.0, (Jun. 2008).
Third Generation Partnership Project, "Technical Specification Group Radio Access Network; Radio Resource Control (RC); Protocol Specification (Release 7)," 3GPP TS 25.331, V7.4.0, (Apr. 2007).
Third Generation Partnership Project, "Technical Specification Group Radio Access Network; Radio Resource Control (RRC); Protocol Specification (Release 7)," 3GPP TS 25.331, V7.8.0, (Mar. 2008).
Third Generation Partnership Project, "Technical Specification Group Radio Access Network; Radio Resource Control (RRC); Protocol Specification (Release 8)," 3GPP TS 25.331, V8.2.0, (Apr. 2008).
Third Generation Partnership Project, "Technical Specification Group Radio Access Network; Evolved Universal Terrestrial Radio Access (E-UTRA) Radio Resource Control (RRC); Protocol specification (Release 8)," 3GPP TS 36.331 V8.2.0 (May 2008).
Third Generation Partnership Project, Technical Specification Group Radio Access Network; Physical Layer Aspects for Evolved Universal Terrestrial Radio Access (UTRA) (Release 7), 3GPP TR 25.814, V7.1.0, (Sep. 2006).
Third Generation Partnership Project, "Technical Specification Group Radio Access Network; Evolved Universal Terrestrial Radio Access (E-UTRA) and Evolved Universal Terrestrial Radio Access Network (E-UTRAN); Radio interface protocol apsects (Release 7)", 3GPP TR 25.813, V7.1.0, (Sep. 2006).
Third Generation Partnership Project, "Technical Specification Group Radio Access Network; Radio Resource Control (RRC); Protocol Specification (Release 7)," 3GPP TS 25.331, V7.4.0, (Apr. 2007).
Third Generation Partnership Project, "Technical Specification Group Radio Access Network; Evolved Universal Radio Access (E-UTRA) and Evolved Universal Terrestrial Radio Access Network (E-UTRAN); Radio interface protocol apsects (Release 7)", 3GPP TR 25.813, V7.1.0, (Sep. 2006).
"Chinese Office Action", Chinese Application No. 200880021231.3, dated Jul. 28, 2014, 5 pages.
"Chinese Office Action (English Translation)", Chinese Application No. 200880021231.3, dated Jul. 28, 2014, 8 pages.

(56) References Cited

OTHER PUBLICATIONS

"Extended European Search Report", European Application No. 14152271.4, dated Mar. 25, 2014, 9 pages.
"Taiwanese Office Action", Taiwanese Application No. 100124686, dated Apr. 10, 2015, 5 pages.
"Taiwanese Office Action (English Translation)", Taiwanese Application No. 100124686, dated Apr. 10, 2015, 4 pages.
"E-UTRA Intra-frequency Measurement Configuration and Control", 3GPP Tdoc R2-0163228, 3GPP TSG RAN WG2, Meeting #56, Riga, Latvia, Nov. 17, 2015, 4 pages.
"Official Notice of Rejection", Japanese Patent Application No. 2015-000568, dated Nov. 17, 2015, 3 pages.
"Official Notice of Rejection (English Translation)", Japanese Patent Application No. 2015-000568, dated Nov. 17, 2015, 3 pages.
"Reexamination Report (English Translation)", Japanese Patent Application No. 2013-048157, dated Aug. 21, 2015, 3 pages.
"Office Action", Korean Patent Application No. 10-2013-7023568, dated Nov. 25, 2015, 4 pages.
"Office Action (English Translation)", Korean Patent Application No. 10-2013-7023568, dated Nov. 25, 2015, 5 pages.
Ericsson, "Measurement scenarios", 3GPP Tdoc R2-070048, 3GPP TSG-RAN WG2 Meeting #56, Sorrento, Italy, Jan. 15-20, 2007, 5 pages.
Ericsson, "Radio Resource Management Aspects of Inter-RAT Handovers", 3GPP-Tdoc R2-071832, 3GPP TSG-RAN WG2 Meeting #58, Kobe, Japan, May 7-11, 2007, 4 pages.
"Examination Notification", Taiwanese Patent Application No. 104122078, dated Jun. 2, 2016, 5 pages.
"Examination Notification (English Translation)", Taiwanese Patent Application No. 104122078, dated Jun. 2, 2016, 4 Pages.
"Patent Abstract of China", Chinese Patent Application No. 1972490, dated May 30, 2007, 2 pages.
"English Language Abstract", Chinese Patent Application No. 1897757, Jan. 17, 2007.
"First Notification of Office Action", Chinese Patent Application No. 201510027671.1, dated Jul. 3, 2017, 6 pages.
"First Notification of Office Action (English Translation)", Chinese Patent Application No. 201510027671.1, dated Jul. 3, 2017, 8 pages.
Ericsson, "RSRQ measurement proposed definition," TSG-RAN WG1 #49bis, R1-073229, Orlando, Florida, USA (Jun. 25-29, 2007).
Ericsson, "RSRP/E-UTRA carrier RSSI for Mobility Support in E-UTRAN," 3GPP TSG-RAN WG4 (Radio) Meeting #42bis, R4-070410, Sophia Antipolis, France (Apr. 2-4, 2007).
NEC, "Measurements related to LTE handover," 3GPP TSG-RAN WG2#57bis, R2-071276, St. Julian's, Malta (Mar. 26-30, 2007).

* cited by examiner

METHOD AND APPARATUS FOR MEASUREMENT REPORTING AND EVENT-TRIGGERED PERIODIC MEASUREMENT REPORTING IN AN EVOLVED UNIVERSAL TERRESTRIAL RADIO ACCESS NETWORK

CROSS REFERENCE TO RELATED APPLICATIONS

This application claims the benefit of U.S. provisional application Nos. 60/945,425 filed Jun. 21, 2007 and 60/949,635 filed Jul. 13, 2007, which are incorporated by reference as if fully set forth.

FIELD OF INVENTION

The present application is related to wireless communications.

BACKGROUND

Long term evolution (LTE) of third generation partnership project (3GPP) is being pursued to develop evolved universal terrestrial radio access (E-UTRA) and evolved universal terrestrial radio access network (E-UTRAN). The objects of the E-UTRA and E-UTRAN are to develop a radio access network supporting a high data rate, low latency, packet optimized system with improved system capacity and coverage. For example, in LTE, instead of current 3GPP code division multiple access (CDMA) technologies, orthogonal frequency division multiple access (OFDMA) and frequency division multiple access (FDMA) air interface technologies will be used in the downlink and uplink, respectively.

In order to support mobility in the E-UTRAN, a user equipment (UE) needs to perform handover related measurements on neighbor cells. The neighbor cell measurements shall be performed in a wide range of realistic and typical deployment scenarios, which include cells on the serving frequency, cells belonging to another frequency, or cells employing other access technologies, such as universal terrestrial radio access network (UTRAN) and global system for mobile communications (GSM)/enhanced data rates for GSM evolution (EDGE) radio access network (GERAN) systems.

A UE reports measurements to the network upon occurrence of a certain event or periodically. In certain situations it is sufficient that the UE starts the periodic reporting after the occurrence of an event. According to this hybrid reporting mechanism when a particular measurement exceeds a pre-specified threshold, the UE switches to periodic reporting after reporting the event, (i.e., event triggered periodical reporting).

The main advantage of the event triggered periodical reporting is that the network does not have to configure periodic reporting for an infinite period of time. This has an advantage of considerably reducing signalling overheads since periodic reporting would commence only when desired. Another advantage is that unlike periodic reporting the UE does not have to report measurements when they are not needed from network perspective.

One typical situation that the event triggered periodic reporting is desired is characterized by a corner effect where there is an abrupt change in path loss. In the wake of such unexpected event, it is desirable for the network to receive periodic reports. These situations are quite typical at some locations in dense urban environment.

Within the measurement reporting criteria field in the measurement control message, the UTRAN notifies the UE which events should trigger a measurement report. The listed events are the toolbox from which the UTRAN can choose the reporting events that are needed for the implemented handover evaluation function or other radio network functions. All the specified events are measured with respect to any of the measurement quantities.

The conventional reporting mechanism has some problems to be implemented in the LTE network. First, currently, there is no definition of events for LTE which reflects the LTE specific characteristics. The events defined for universal mobile telecommunications system (UMTS) reflect the channel and frame structure of CDMA system and they cannot be applied to the LTE system which has an OFDM-based frame structure. For example, the primary common pilot channel (CPICH) used in UMTS for event definition is no longer applicable for the LTE system since the CPICH is not existing at all. So events reflecting the LTE system characteristics should be provided Second, there is no mechanism available in the LTE system for event triggered periodic measurement reporting. The mechanism used in UMTS cannot be directly used in LTE for event triggered periodic reporting because in order to better utilize the system resources, no dedicated channel is allocated to the UE in LTE and an active set is no longer maintained for the LTE operations including measurement and measurement reporting. Therefore, a modified mechanism should be provided for LTE.

Third, in the LTE system, there is no dedicated uplink channel. Therefore, a mechanism for request and scheduling of uplink resource for periodic measurement reporting after certain event is necessary.

SUMMARY

A method and apparatus for measurement reporting and event-triggered periodic measurement reporting in an E-UTRAN are disclosed. A wireless transmit/receive unit (WTRU) monitors cell-specific reference signals from a serving cell and one or more neighbor cells to detect a reporting event defined for the E-UTRAN. Once a reporting event is detected, the WTRU sends a measurement report to the network. The measurement quantity may be a reference signal received quality (RSRQ). After detection of the reporting event, the WTRU may send event-triggered measurement reports periodically. The WTRU may send a scheduling request to the network for the event-triggered periodic measurement reports. The WTRU may send a termination indication if the event-triggered periodic measurement reports are terminated before a configured number of times. The WTRU may send an extension request if a specified number of periodic reporting has been sent but more reports still need to be sent.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION

When referred to hereafter, the terminology "WTRU" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "Node B" includes but is not limited to a base station, a site controller, an access point (AP), or any other type of interfacing device capable of operating in a wireless environment.

In order to support mobility in the E-UTRAN, a WTRU monitors cell-specific reference signals on the serving cell and one or more neighbor cells in accordance with the configuration from the E-UTRAN, which is provided via a measurement control message. The E-UTRAN notifies the WTRU which events should be reported to the network and which events should trigger periodic measurement reporting. Based on the reported measurement reports, the E-UTRAN performs a handover evaluation function and other radio network functions.

Figure 1:
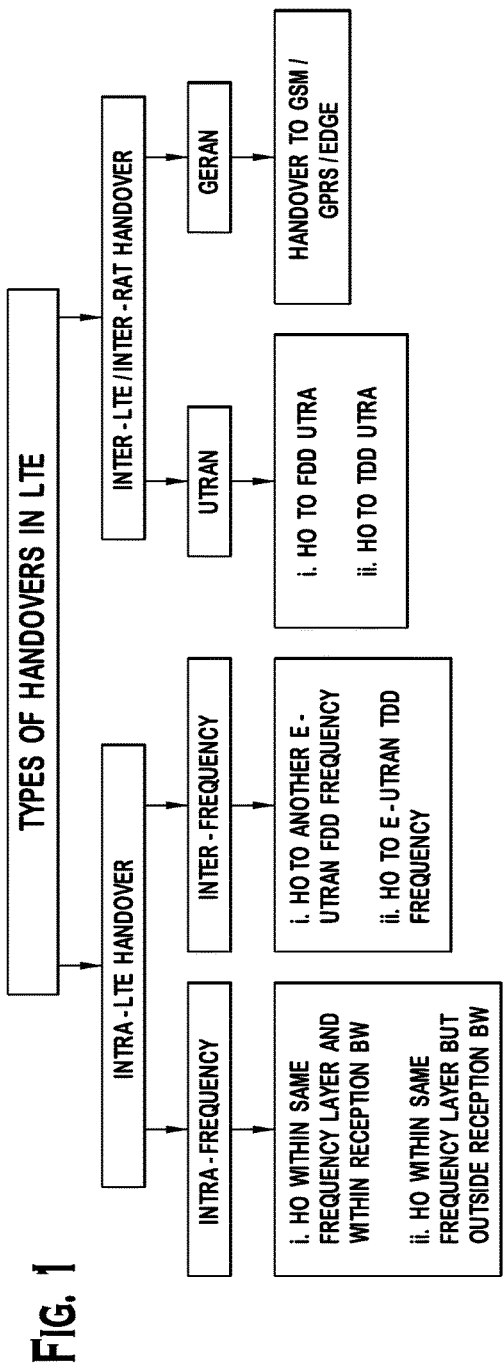
FIG. 1 shows conventional handover scenarios supported by E-UTRA.

FIG. 1 shows different types of handovers that need to be supported in the E-UTRAN. An intra-LTE handover is a handover within the LTE system, and an inter-LTE or an inter-RAT handover is a handover to and from a non-LTE system, (e.g., UTRAN or GERAN). The intra-LTE handover may be an intra-frequency handover or an inter-frequency handover within the LTE system. The intra-frequency handover within the LTE system may be a handover within the same frequency and within the reception bandwidth, or a handover within the same frequency but outside the reception bandwidth. The inter-frequency handover within the LTE system may be a handover to and from another E-UTRAN frequency division duplex (FDD) frequency or a handover to and from E-UTRAN time division duplex (TDD) frequency.

Three different categories of measurement events are defined in the LTE system: intra-frequency reporting events, inter-frequency reporting events, and inter-RAT reporting events.

The intra-frequency reporting events are reported to the network for evaluating the intra-frequency handover within the LTE system. The intra-frequency reporting events are defined as follows.

Intra-frequency measurement reporting event-1: A measurement quantity on a non-serving LTE cell, (i.e., a neighbor cell), becomes better than a measurement quantity on the serving LTE cell by a certain margin. For example, if an intra-frequency neighbor cell's reference signal received quality (RSRQ) is measured above the serving cell's RSRQ by a pre-configured margin, the WTRU reports this event to the network. The E-UTRAN may command with the measurement margin the WTRU to report this event at the connected state to prepare for cell redirection if the neighbor cell RSRQ is better than the serving cell RSRQ to become a cell redirection candidate, or to trigger an intra-frequency handover if the serving cell RSRQ is measured below the serving cell threshold.

Intra-frequency measurement reporting event-2: The best neighbor cell is measured above the serving cell threshold by a pre-defined margin. For example, when an intra-frequency neighbor cell's RSRQ is measured the best among other neighbor cells and the measurement is above the serving cell threshold by a pre-configured margin while the serving cell's RSRQ is still below the serving cell threshold, the WTRU reports this event to the network. The E-UTRAN may command the WTRU to report this event at the connected state for preparation of possible intra-frequency handover.

Intra-frequency measurement reporting event-3: A measurement quantity on the serving LTE cell becomes better than an absolute threshold. For example, if the serving cell RSRQ is measured above the serving cell minimum threshold, the WTRU reports this event to the network. The E-UTRAN may command the WTRU to report this event at the connected state for stopping preparation for possible handover or cell redirection or other types of WTRU measurements for WTRU mobility. The E-UTRAN may also use this event report to stop measurement gap allocation. Upon occurrence of this event, the WTRU may stop all possible intra- or inter-frequency LTE measurement, or inter-RAT measurement on neighbor cells for mobility if so configured previously.

Intra-frequency measurement reporting event-4: A measurement quantity on the serving LTE cell becomes worse than an absolute threshold. For example, if the serving cell's RSRQ is measured below the serving cell threshold, the WTRU reports this event to the network. The serving cell threshold may be a standard defined minimum RSRQ value or a minimum RSRQ value configured for a specific LTE cell. The E-UTRAN may command the WTRU to report this event at the connected state for preparation of possible handover or cell redirection or command of other types of WTRU measurements (including measurement gap allocation) for WTRU mobility. The WTRU may report this event to the E-UTRAN when in a connected state and start intra-frequency LTE measurement on neighbor cells or other measurements commanded by the E-UTRAN.

Intra-frequency measurement reporting event-5: All intra-frequency LTE neighbor cell's RSRQs are measured below a neighbor cell threshold and the serving cell RSRQ is below the serving cell threshold. The neighbor cell threshold may be same to the serving cell threshold or may be a different system configured threshold. The E-UTRAN may command the WTRU to report this event at the connected state for indication of the need for activating inter-frequency LTE measurement or activating inter-RAT measurement. It is also an indication for the E-UTRAN to start configuring measurement gap allocation for the needed inter-frequency LTE or inter-RAT measurements.

The inter-frequency reporting events are reported to the network for evaluating the inter-frequency handover within the LTE system. The inter-frequency reporting events are defined as follows.

Inter-frequency measurement reporting event-1: The estimated quality of the currently used LTE frequency is below a certain threshold and the estimated quality of a non-used LTE frequency is above a certain threshold. A non-used frequency is a frequency that the WTRU has been ordered to measure upon but is not used for the connection. A used frequency is a frequency that the WTRU has been ordered to measure upon and is currently used for the connection. The WTRU may report this event to the E-UTRAN and the E-UTRAN may command the WTRU to perform an inter-frequency handover based on the general load and resource condition of that unused frequency.

Inter-frequency measurement reporting event-2: The neighbor cell RSRQ in an unused LTE frequency band is the best among its peers and is above a relevant threshold. This threshold may be configured by the network or may be derived by the WTRU based on system directives. The E-UTRAN may command the WTRU to report this event at the connected state for indication of a possible inter-frequency LTE handover.

The inter-RAT reporting events are reported to the network for evaluating the inter-LTE or inter-RAT handover. The inter-RAT reporting events are defined as follows: the estimated quality of the currently used LTE frequency is below a certain threshold and the estimated quality of the other system (the other RAT) is above a certain threshold. The WTRU may report this event to the E-UTRAN and the E-UTRAN may negotiate with the other system/RAT to command the WTRU for an inter-RAT handover.

For all measurement events disclosed above, a hysteresis and/or a timer to trigger the measurement may be commanded by the E-UTRAN to avoid ping-pong effect.

For inter-frequency LTE handover, when the measured quantity of the unused LTE frequency band is better than that of the currently used LTE frequency band, the WTRU reports this event to the network. Since frequent inter-frequency switching, (i.e., handover to another frequency in the LTE system), is not desirable for both the system and WTRU perspective, a measurement of the unused inter-frequency LTE band should be performed to ensure that if a handover is performed to the unused LTE frequency band there are a number of LTE cells to support stable operation of the WTRU in the frequency band for a certain period of time.

To better measure the quality of the LTE frequency bands and to ensure stability of the WTRU operation in the frequency band for a minimum period of time after an inter-frequency LTE handover, the LTE frequency quality estimation includes not only the total received wideband power from all possible sources and co-channel and adjacent channel interferences and thermal noise, but also the RSRQ measurements of WTRU-observable cells, so that if the WTRU is handed over to an LTE frequency band, the WTRU will have at least a few cells to camp and operate on for a certain period of time without an inter-frequency ping-pong effect. The measurement quantity for the frequency band may also be E-UTRAN carrier received signal strength indicator (RSSI), which reflects the aggregated cell load in that frequency band plus the interferences and noises around.

For a WTRU to measure and estimate the reception quality of an unused LTE frequency band, the network configures the following parameters for the measurement:

(1) a minimum RSRQ threshold; Cells selected for frequency quality measurement, (i.e., cells in a measurable cell set), must have the measured RSRQ equal to or greater than the minimum RSRQ threshold;

(2) a minimum and optionally a maximum number of cells for frequency quality measurement, (i.e., the minimum or optionally maximum number of the measurable cell set elements);

(3) a hysteresis and a timer to trigger measurements and weight values used to evaluate RSRQ measurements;

(4) unused LTE frequency band cell information for the cells in the measurable cell set; This information may be configured by the E-UTRAN or may be generated by the WTRU by detecting the cells for RSRQ measurement. In either case cells with lower than a RSRQ threshold are not included in the measurable cell set. If there are more cells than the configured maximum number of cells qualified to be in the measurable cell set, the N (N is the configured maximum number of cells for measurement) cells are taken based on the measured RSRQ values;

The quality estimation on the unused LTE frequency band is conducted by summing up the individual RSRQ results from the cells in the measurable cell set, and may be converted to the required reporting measurement unit. The summation may just use each plain individual cell result or may apply a certain weight value to the best and/or the poorest RSRQ values in order to smooth out the sudden surge. The frequency quality measurement report to the network may include the number of measurable cells to indicate the staying condition after a possible handover to the frequency.

An event triggered periodic measurement reporting procedure is explained hereinafter with reference to FIGS. 2 and 3. The procedure will be explained with respect to the intra-frequency measurement reporting event-1 as an example. However, it should be noted that any of the measurement reporting events disclosed above may trigger periodic measurement reporting and the event triggered periodic measurement reporting procedure explained herein is generic to all other measurement reporting events in all categories including the LTE intra-frequency/inter-frequency handover and inter-LTE/inter-RAT handover situations and applicable to any of the measurement reporting events.

Figure 2:
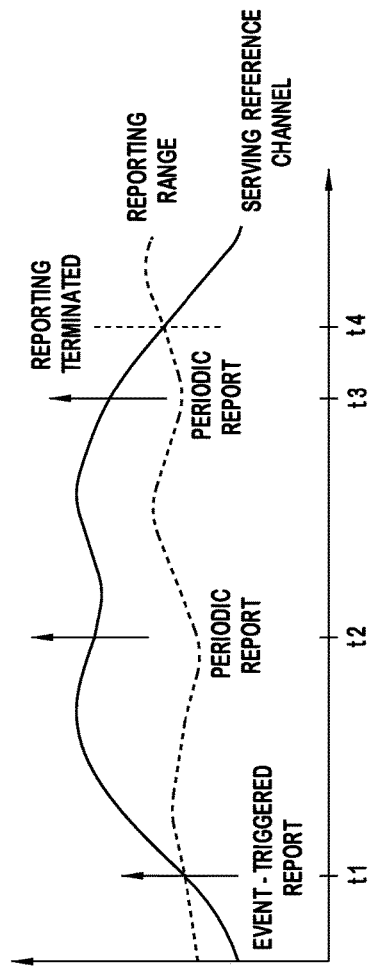
FIG. 2 illustrates periodic measurement reporting triggered by event L1A.
Figure 3:
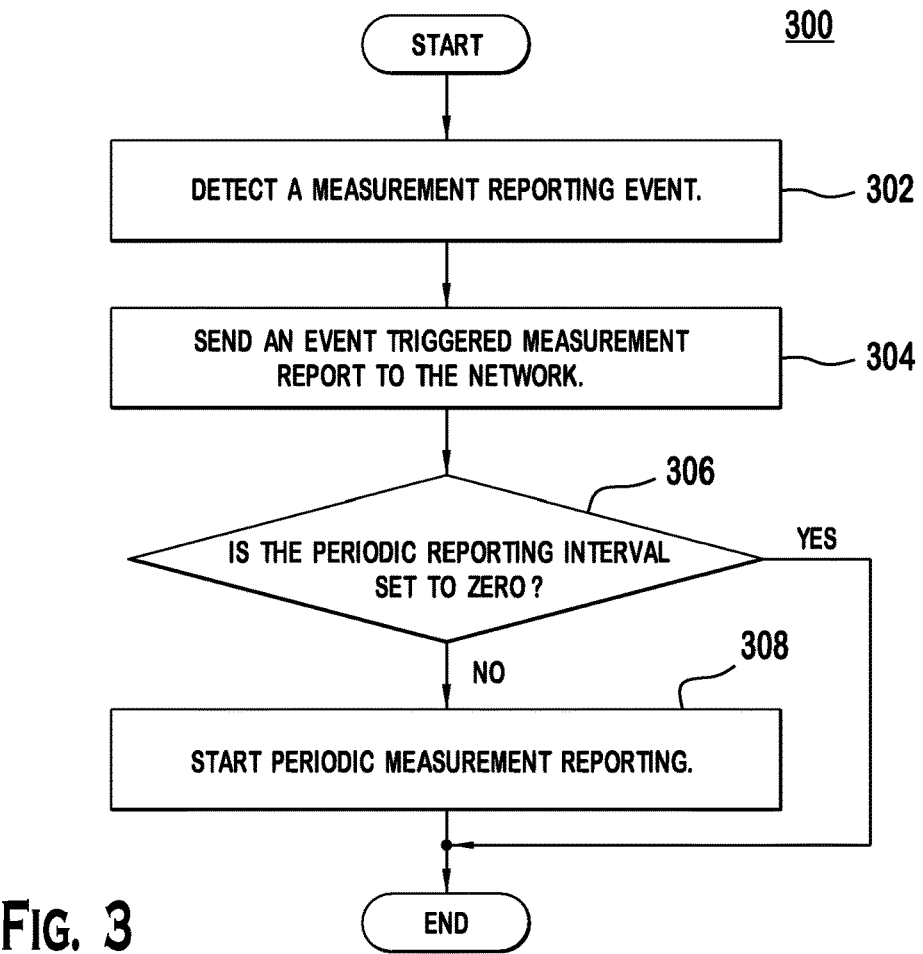
FIG. 3 is a flow diagram of a process of event-triggered periodic measurement reporting in the LTE system.

FIG. 2 illustrates periodic measurement reporting triggered by the intra-frequency measurement reporting event-1. FIG. 3 is a flow diagram of a process 300 of event-triggered periodic measurement reporting in the LTE system. A WTRU detects a measurement reporting event, (in this example, the intra-frequency measurement reporting event-1), (step 302). As shown in FIG. 2, the reporting event is detected at t1 when the measurement quantity on the serving cell reference channel becomes higher than the reporting range value. The WTRU sends an event triggered measurement report to the network (step 304). The WTRU then checks if the periodic reporting interval is set to zero (step 306). If the reporting interval is set to zero, no periodic reporting is initiated and the process 300 ends. If the reporting interval is not set to zero, the WTRU starts periodic measurement reporting (step 308).

The periodic measurement reporting is performed at the specified intervals and for the specified number of times. At each periodic measurement reporting interval, (t2 and t3 in FIG. 2), the WTRU transmits a measurement report to the E-UTRAN.

The reporting interval and the required number of reports are configured by the E-UTRAN in a measurement control message. Several reporting intervals and parameters may be configured for several reporting events at the same time. The measurement reports may include measurement quantity with respect to the cells in the candidate set and/or the monitored cell set in the reporting margin. The monitored cell set includes cells that the WTRU need to perform measurements.

The periodic measurement reporting is terminated after the configured number of times, which is specified by the E-UTRAN. In addition, the periodic measurement reporting may also be terminated if there is no cell that satisfies the reporting criteria (out of the range of the event), if the E-UTRAN or the WTRU has already updated the candidate set based on the new measurement and evaluation, or if the maximum number of measurement reporting has been sent. For example, as shown in FIG. 2, the periodic measurement reporting may be terminated if the measurement quantity on the serving cell reference channel becomes lower than the reporting range value at t4.

A resource scheduling process for supporting event triggered periodic measurement reporting in LTE is explained hereinafter. There are three situations with respect to the event-triggered measurement reporting and resource scheduling. The first case is that there is only one event that is currently triggered. The second is that two or more measurement reporting is triggered about the same time. The third case is that an event is triggered for periodic reporting while there is a reporting event that has been triggered earlier before the end of the previously triggered event.

Figure 4:
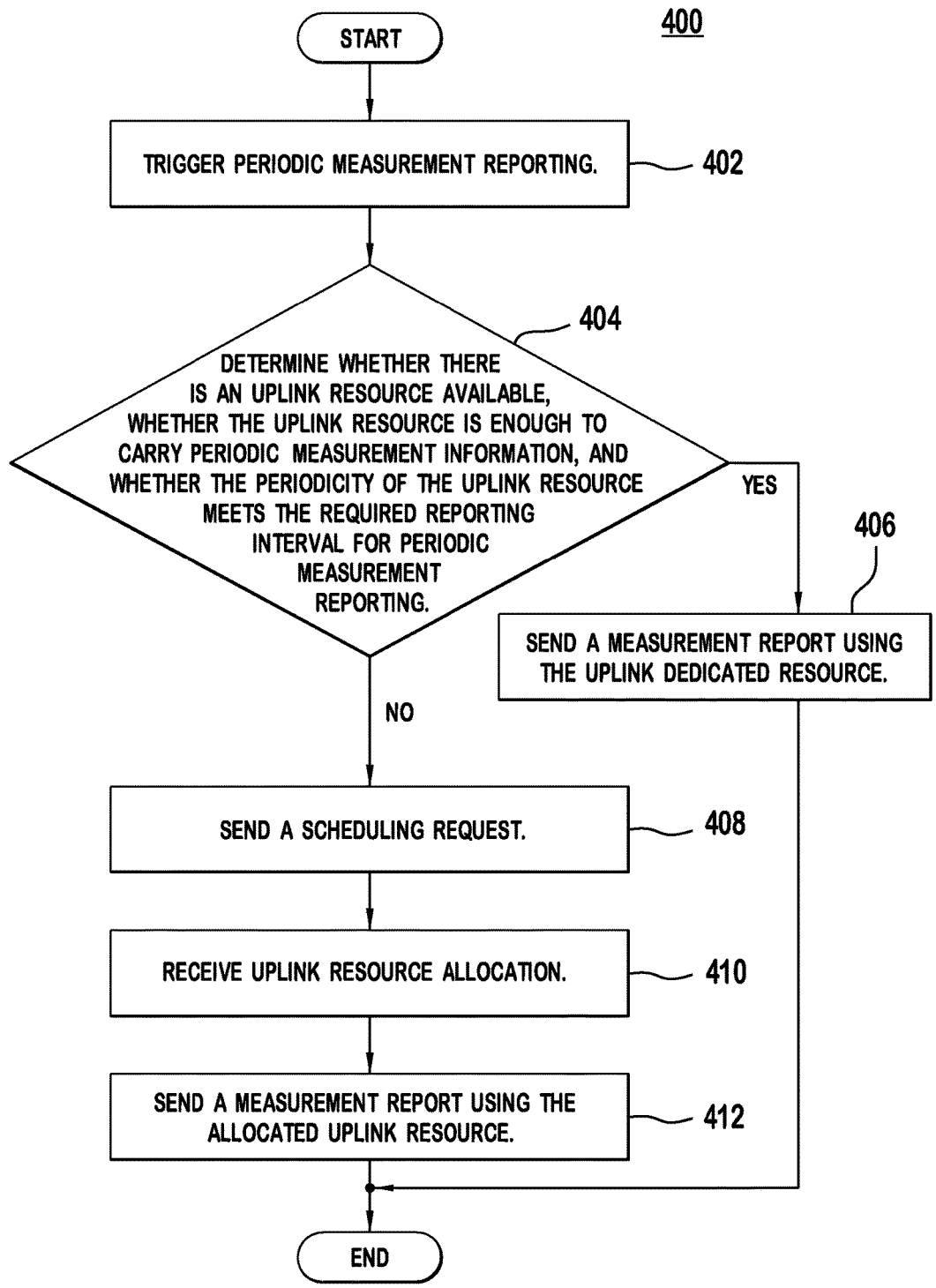
FIG. 4 is a flow diagram of a process of resource scheduling for supporting event triggered periodic measurement reporting in case that there is only one event triggered.

FIG. 4 is a flow diagram of a process 400 of resource scheduling for supporting event triggered periodic measurement reporting in case there is only one event triggered. When periodic reporting is triggered (step 402), the measurement needs to be reported at the specified intervals. For the periodic reporting, the WTRU determines whether there is an uplink resource available, whether the uplink resource is enough to carry periodic measurement information, and whether the periodicity of the uplink resource meets the required reporting interval for periodic measurement reporting (step 404). If all these conditions are met, the WTRU uses the uplink resource for periodic measurement report (step 406).

If any of these conditions is not met, the WTRU sends a scheduling request to an evolved Node B (eNB) for a new periodic uplink resource allocation (step 408). The scheduling request may include the needed amount of resource and the number of reports that need to be sent by the WTRU. The granularity of resource request may be specified in standards and signaled by the E-UTRAN based on the size of measurement reports for different measurement quantities and events. The WTRU may request a number of minimum granularity of resources based on the number of events and measurement report quantities.

The WTRU then receives an uplink periodic resource allocation from the eNB (step 410). When the eNB allocates an uplink periodic resource, the eNB may allocate the resources, (i.e., the number of repetitions and periodicity), based on what is specified by the E-UTRAN or what is requested by WTRU. If the needed resource amount is not indicated in the resource request, the eNB may allocate resources based on the standardized amount. The WTRU sends the measurement reports using the allocated uplink resources (step 412).

The periodic measurements may be terminated before the specified number of reports. In such case, the WTRU may send an indication of termination to the E-UTRAN. The termination indication may be sent along with the last measurement report to the eNB. Alternatively, the termination indication may be sent separately via L1 or L2 signaling, (e.g., in the medium access control (MAC) header).

The periodic measurements may need to be extended when reaching the specified number of reports. If the specified number of periodic reporting has been sent, but more reports still need to be sent, the WTRU may send an extension request to the eNB for the extension of periodic uplink resource. The extension request may be included in the measurement report or may be sent via L1 or L2 signaling. The WTRU may specify the new number of reports that the WTRU will send in the extension request. Alternatively, if the number of reports is not indicated, the same number for the last periodic reports may be allocated by the eNB.

In case several events are triggered about the same time, the process of periodic reporting and resource scheduling is similar to the process 400. Different event-triggered reporting may have the same intervals and/or specified number of reports, or may have different intervals and/or specified number of reports. The multiple reports may be combined together or may be reported separately. If the current uplink resource allocated to the WTRU is not enough, an additional resource request may be sent to the E-UTRAN.

The scheduling request may request resources for all events triggered. The amount of resources and the reporting interval for each event (if they are different) may be specified in the scheduling request. If several reports are combined together, the total amount of resources should be requested and allocated for periodic reporting.

If any event-triggered periodic measurement reporting needs to be terminated earlier than the specified number of times, the WTRU may send a termination indication to the eNB. Alternatively, the WTRU may use or consume the allocated resource without change. The allocated uplink resource may not be long-lasting, and the WTRU may have it for any purpose and may not use it in order to save the signaling overhead between the WTRU and the E-UTRAN. If any one of the triggered periodic measurement reporting needs to be extended when the specified number of reporting has been performed, the WTRU may send an extension request for that reporting.

An event may be triggered for periodic reporting while there is a reporting event that has been triggered earlier before the end of the previously triggered event. A new resource request for the subsequently triggered periodic reporting may be requested separately. The new reporting may be combined with the early triggered periodic reporting.

Figure 5:
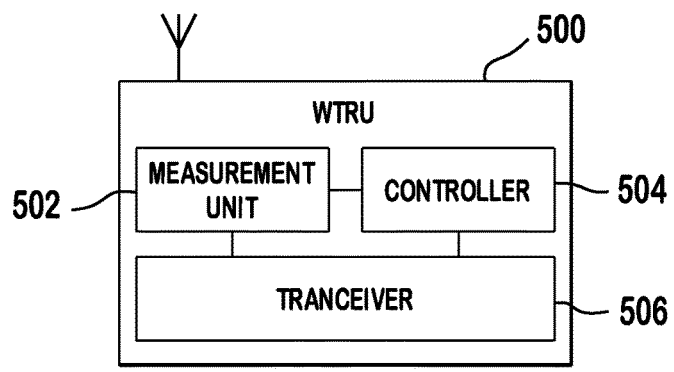
FIG. 5 is a block diagram of an example WTRU.

FIG. 5 is a block diagram of an example WTRU 500. The WTRU includes a measurement unit 502, a controller 504, and a transceiver 506. The measurement unit 502 is adapted to measure a measurement quantity on cell-specific reference signals from a serving cell and a neighbor cell as disclosed above. The measurement quantity may be intra-frequency measurement, inter-frequency measurement, or inter-RAT measurement. The controller 504 is adapted to control the overall measurement and reporting procedures disclosed above. The controller 504 detects a reporting event defined for the E-UTRAN and sends a measurement report via the transceiver 506.

The controller 504 may send event-triggered periodic measurement reports periodically as stated above. The controller 504 is also adapted to send a scheduling request for the event-triggered periodic measurement reports and send the event-triggered periodic measurement reports using resources allocated. The controller 504 may send a termination indication if the event-triggered periodic measurement reports are terminated before configured number of times. The controller 504 may send an extension request if a specified number of periodic reporting has been sent but more reports still need to be sent.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method for measurement reporting implemented in a wireless transmit receive unit (WTRU), the method comprising:
   receiving, by the WTRU, a reporting event configuration from an evolved-universal terrestrial radio access network (E-UTRAN), the reporting event configuration including information associated with: (1) a plurality of events, the plurality of events including any of: a first event corresponding to a first measurement quantity associated with a serving cell exceeding a first threshold, a second event corresponding to a second measurement quantity associated with a neighbor cell exceeding a third measurement quantity on the serving cell by a predefined margin, a third event corresponding to a fourth measurement quantity associated with the neighbor cell exceeding a second threshold, a fourth event corresponding to a fifth measurement quantity associated with the serving cell not exceeding a third threshold, and a fifth event corresponding to a sixth measurement quantity associated with the serving cell not exceeding a fourth threshold and a seventh measurement quantity associated with the neighbor cell exceeding a fifth threshold, (2) reporting interval information, and (3) for each of the plurality of events, a number of times a measurement report is to be transmitted;
   detecting, by the WTRU, a reporting event that corresponds to any of the first, second, third, fourth, or fifth events;
   determining, by the WTRU, for the detected reporting event, the number of times the measurement report is to be transmitted; and
   on condition that the detected reporting event corresponds to any of the first, second, third, fourth, or fifth events, transmitting, by the WTRU to the E-UTRAN, the measurement report the determined number of times according to the detected reporting event,
   wherein the measurement report is periodically transmitted.

2. The method of claim 1, wherein any of the first and third thresholds is an absolute threshold.

3. The method of claim 1, wherein the reporting interval information indicates a time period between consecutive transmissions of the measurement report.

4. The method of claim 1, wherein any of the first, second, third, fourth, fifth, sixth, or seventh measurement quantities are a reference signal received quality (RSRQ).

5. The method of claim 1, wherein the reporting event configuration includes information indicating a hysteresis for triggering the measurement report.

6. The method of claim 1, wherein the reporting event configuration includes information indicating a timer for triggering the measurement report.

7. The method of claim 1, wherein the measurement report includes information indicating reference signal received quality (RSRQ) measurements associated with an unused frequency band of a measurement cell set and a total received wideband power of all radio frequency sources associated with the unused frequency band.

8. The method of claim 7, wherein the measurement report includes information indicating a quality of the unused frequency band indicating a summation of the RSRQ measurements associated with the measurement cell set.

9. The method of claim 1, further comprising:
   transmitting a scheduling request for periodic transmission of the measurement report;
   receiving a resource allocation after transmitting the scheduling request; and
   transmitting the measurement report periodically using the received resource allocation.

10. The method of claim 1, further comprising:
    transmitting the measurement report periodically in accordance with the reporting interval and the number of times indicated in the reporting event configuration.

11. The method of claim 1, further comprising, on condition that the measurement report is transmitted more or less than the determined number of times the measurement report is to be transmitted according the detected reporting event, transmitting a termination indication.

12. A wireless transmit receive unit (WTRU) configured to perform measurement reporting, the WTRU comprising:
    a transceiver configured to receive a reporting event configuration from an evolved-universal terrestrial radio access network (E-UTRAN), the reporting event configuration including information associated with: (1) a plurality of events, the plurality of events including any of: a first event corresponding to a first measurement quantity associated with a serving cell exceeding a first threshold, a second event corresponding to a second measurement quantity associated with a neighbor cell exceeding a third measurement quantity associated with the serving cell by a predefined margin, a third event corresponding to a fourth measurement quantity associated with the neighbor cell exceeding a second threshold, a fourth event corresponding to a fifth measurement quantity associated with the serving cell not exceeding a third threshold, and a fifth event corresponding to a sixth measurement quantity associated with the serving cell not exceeding a fourth threshold and a seventh measurement quantity associated with the neighbor cell exceeding a fifth threshold, (2) a reporting interval, and (3) for each of the plurality of events, a number of times a measurement report is to be transmitted;

a controller configured to:
  detect a reporting event that corresponds to any of the first, second, third, fourth, or fifth events; and
  determine, for the detected reporting event, the number of times the measurement report is to be transmitted;
wherein the transceiver is further configured to:
  on condition that the detected reporting event corresponds to any of the first, second, third, fourth, or fifth events, transmit, to the E-UTRAN, the measurement report the determined number of times according to the detected reporting event, and
wherein the measurement report is periodically transmitted.

13. The WTRU of claim 12, wherein any of the first and third thresholds is an absolute threshold.

14. The WTRU of claim 12, wherein the reporting interval information indicates a time period between consecutive transmissions of the measurement report.

15. The WTRU of claim 12, wherein any of the first, second, third, fourth, fifth, sixth, or seventh measurement quantities are a reference signal received quality (RSRQ).

16. The WTRU of claim 12, wherein the reporting event configuration includes information indicating a hysteresis for triggering the measurement report.

17. The WTRU of claim 12, wherein the reporting event configuration includes information indicating a timer for triggering the measurement report.

18. The WTRU of claim 12 wherein the controller configures the measurement report to include reference signal received quality (RSRQ) measurements associated with an unused frequency band of a measurement cell set and a total received wideband power from all radio frequency sources associated with the unused frequency band.

19. The WTRU of claim 18, wherein the controller is configured to include, in the measurement report, information indicating a quality of the unused frequency band indicating a summation of the RSRQ measurements associated with the measurement cell set.

20. The WTRU of claim 12, wherein the transceiver is further configured to:
  transmit a scheduling request for periodic transmission of the measurement report;
  receive a resource allocation after transmitting the scheduling request; and
  transmit the measurement report periodically using the received resource allocation.

21. The WTRU of claim 12, wherein the transceiver is configured to transmit the measurement report periodically in accordance with the reporting interval and the number of times indicated in the reporting event configuration.

22. The WTRU of claim 12, wherein, on condition that the measurement report is transmitted more or less than the determined number of times the measurement report is to be transmitted according the detected reporting event, the controller is further configured to transmit a termination indication.

* * * * *